United States Patent [19]

Moore et al.

[11] Patent Number: 5,797,339

[45] Date of Patent: Aug. 25, 1998

[54] OPTICAL REMOTE CONTROL FOR TROLLING MOTORS AND METHOD OF CONTROL

[75] Inventors: Prentice Gean Moore, Starkville, Miss.; Stephen P. Malak, Tulsa, Okla.

[73] Assignee: Brunswick Corporation, Lake Forest, Ill.

[21] Appl. No.: 766,571

[22] Filed: Dec. 12, 1996

[51] Int. Cl.[6] .................................................. B63H 25/00
[52] U.S. Cl. ......................................... 114/144 A; 440/7
[58] Field of Search .......................... 114/144 A; 440/6, 440/7; 355/142, 143, 144, 148

[56] References Cited

U.S. PATENT DOCUMENTS

| | | | |
|---|---|---|---|
| 2,253,757 | 8/1941 | Bugatti | 115/35 |
| 2,804,838 | 9/1957 | Moser | 115/18 |
| 2,877,733 | 3/1959 | Harris | 115/18 |
| 2,972,328 | 2/1961 | Hodgson | 115/41 |
| 3,026,545 | 3/1962 | Brainard, II | 9/14 |
| 3,387,582 | 6/1968 | Reeves | 115/5 |
| 3,598,947 | 8/1971 | Osborn | 200/86.5 |
| 3,602,181 | 8/1971 | Harris | 114/153 |
| 3,604,389 | 9/1971 | Roberts et al. | 115/7 |
| 3,606,858 | 9/1971 | Edwards et al. | 115/18 |
| 3,689,927 | 9/1972 | Boston | 343/225 |
| 3,765,362 | 10/1973 | Gitchel | 114/144 A |
| 3,807,345 | 4/1974 | Peterson | 115/18 E |
| 3,889,625 | 6/1975 | Roller et al. | 114/18 E |
| 3,952,681 | 4/1976 | Tucker | 114/144 A |
| 3,980,039 | 9/1976 | Henning | 115/41 R |
| 4,008,500 | 2/1977 | Hall, Jr. | 9/7 |
| 4,114,074 | 9/1978 | Stewart et al. | 318/257 |
| 4,143,436 | 3/1979 | Jones | 9/7 |
| 4,152,703 | 5/1979 | Ziemke et al. | 343/119 |
| 4,161,077 | 7/1979 | Ciaccio et al. | 43/26.1 |
| 4,224,762 | 9/1980 | McCaslin | 46/256 |
| 4,565,529 | 1/1986 | Aertker et al. | 440/7 |
| 4,614,900 | 9/1986 | Young | 318/16 |
| 4,824,408 | 4/1989 | Aertker et al. | 440/6 |
| 5,050,519 | 9/1991 | Senften | 114/144 |
| 5,073,979 | 12/1991 | Webb | 359/142 |
| 5,606,930 | 3/1997 | LeBlanc et al. | 440/6 |

FOREIGN PATENT DOCUMENTS 5-175910  7/1993  Japan ................ 359/142

OTHER PUBLICATIONS

Zebco Company, MotorGuide 1995, 21 pages.
Sears SpeciaLog, Boating and Fishing, 1986/87, p. 18.

*Primary Examiner*—Sherman Basinger
*Attorney, Agent, or Firm*—Baker & Botts, L.L.P.

[57] ABSTRACT

A system (8) for controlling from a remote position the direction and speed of a trolling motor (16) that includes a steering motor (24) for turning the trolling motor (16), an optical receiver (22) coupled to the steering motor (24) and to a throttle (26), which is coupled to the trolling motor (16), and one or more reflectors (30, 40). An operator (10) may use a transmitter (18, 20) to develop an optical signal (34) representing a desired direction and speed for the trolling motor (16). Optical reflectors (30) assure delivery of the optical signal (34) to the optical receiver (22) notwithstanding potential obstacles (31).

12 Claims, 1 Drawing Sheet

OPTICAL REMOTE CONTROL FOR TROLLING MOTORS AND METHOD OF CONTROL

FIELD OF THE INVENTION

The present invention relates in general to trolling motors for boats, and more particularly to an optical remote control system and method for trolling motors.

BACKGROUND OF THE INVENTION

Trolling motors are used by fishermen and other boaters as a motor to propel the boat short distances and to provide precise positioning of the boat. Originally, trolling motors could be steered only by a pilot positioned next to the motor. Such steering was accomplished by hand with a handle or using a foot pedal connected by cables.

Some recent steering systems for trolling motors have used radio frequency (RF) to allow remote operation. RF remote control steering systems for trolling motors have experienced a number of shortcomings. For example, hardware must be designed to account for and shield electrical interference caused by steering motor brush noise, control electronics, other adjacent radio controlled trolling motors, and nearby communication transmitters operating at or near the same frequency. In addition, moisture on high-frequency communication circuits may adversely affect operation.

SUMMARY OF THE INVENTION

From the foregoing, it may be appreciated that a need has arisen for control system for trolling motors that eliminates or greatly reduces the shortcomings of RF systems.

According to an aspect the invention, an optical control system is provided that eliminates or substantially reduces the shortcomings of previous systems.

According to an aspect of the present invention, a system for controlling the direction and speed of a trolling motor on a boat from a remote position is provided that includes a steering motor associated with the trolling motor, a throttle associated with the trolling motor for controlling the speed, an optical transmitter for developing an optical signal representing the desired direction and speed for the trolling motor, an optical receiver associated with the steering motor and throttle of the trolling motor for receiving the optical signal and activating the steering motor in responses to the desired direction represented by the optical signal and activating the throttle in response to the desired speed represented by the optical signal, and one or more optical reflectors mounted on a portion of the boat for reflecting the optical signal to the optical receiver.

According to another aspect of the present invention, a method for controlling the direction and speed of a fishing boat is provided that includes the steps of manually entering a desired speed and direction for the boat on a remote transmitter, generating optical signals from the remote transmitter representing the desired speed and direction, reflecting the optical signals off of an optical reflecting surface, receiving the optical signals with a receiver, generating control signals from the optical signal received by the receiver, and delivering the control signals to a steering motor and throttle associated with the trolling motor to move the fishing boat at the desired speed and in the desired direction.

A technical advantage of the present invention is that the optical communication eliminates problems with electrical interference since the communication media is light. Another technical advantage of the present invention is that fewer channels are required since the range is less than RF systems. Another technical advantage is that the present invention has a smaller range provided by optical control and the smaller range mitigates the problems that might arise from the simultaneous operation of two or more adjacent trolling motors.

BRIEF DESCRIPTION OF THE DRAWINGS

For a more complete understanding of the present invention, and the advantages thereof, reference is now made to the following written description taken in conjunction with the accompanying drawings, in which like reference numbers indicate like features, and wherein.

DETAILED DESCRIPTION OF THE INVENTION

The preferred embodiments of the present invention and its advantages are best understood by referring to FIGS. 1–4 of the drawings, like numerals being used for like and corresponding parts of the various drawings.

Figure 1:
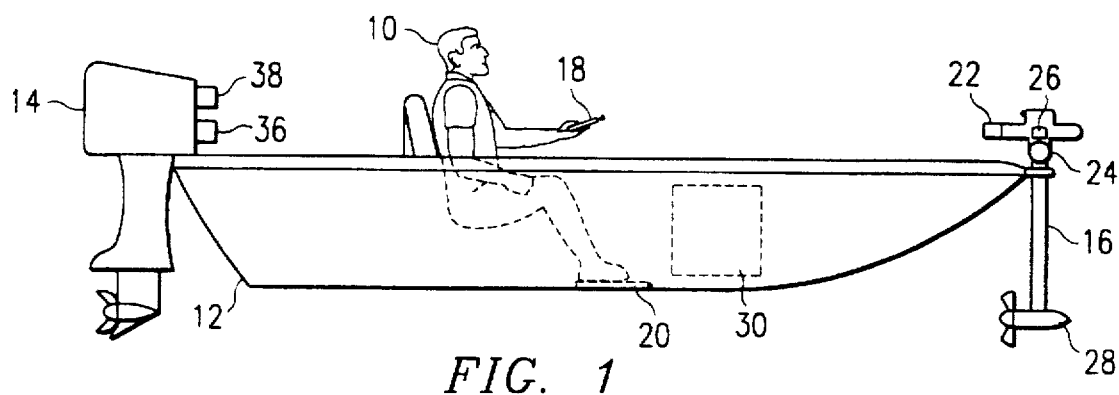
FIG. 1 is a schematic diagram in elevation of an embodiment of the invention.
Figure 2:
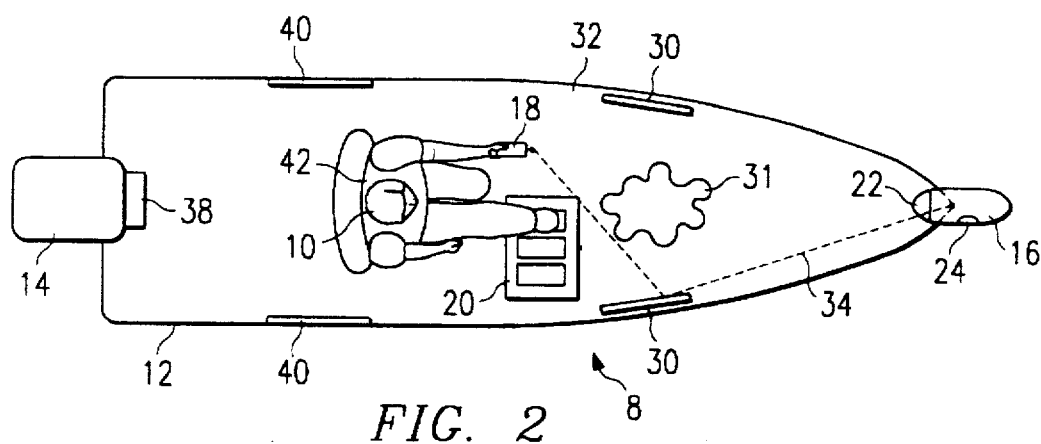
FIG. 2 is a top schematic diagram of the embodiment of the invention of FIG. 1.

Referring to FIGS. 1 and 2, operator 10 is shown in boat 12. Boat 12 has a main propulsion motor such as outboard motor 14 and a trolling motor 16. Any number of trolling motors may be adapted for use with the present invention. Reference is made to U.S. Pat. No. 4,099,478 to Alexander and assigned to Brunswick Corp., Skokie, Ill., which is incorporated herein for all purposes.

Operator 10 may be positioned within boat 12 remote from trolling motor 16 and outboard motor 14. Operator 10 may control trolling motor 16 from the remote position by use of an optical hand-held transmitter 18 or a foot-operated optical transmitter 20. In a preferred embodiment, the optical transmitter is an infrared (IR) transmitter. Transmitters 18 and 20 contain transmitter circuits, which will be described in more detail below, which produce optical signals representing the desired speed of trolling motor 16 and the desired direction of trolling motor 16 with respect to boat 12. Transmitters 18 and 20 may have, for example, left and right buttons or pedals for adjusting the desired direction and a third button or throttle for designating the desired speed.

The optical signal developed by transmitters 18 and 20 are received by an optical receiver 22. Optical receiver 22 is also coupled to steering motor 24 and provides an appropriate signal to steering motor 24 to cause it to turn trolling motor 16 to move boat 12 in a desired direction. Optical receiver 22 is coupled to trolling motor throttle 26, which controls the speed of trolling motor 16. With reference to coupling steering motor 24 to trolling motor 16, numerous techniques known in the art may be used; for example, reference is made to U.S. Pat. No. 5,171,173 to Henderson, et al. and assigned to Zebco Corporation, Tulsa, Okla., which is incorporated herein for all purposes, and U.S. Pat. No. 5,112,256 to Clement and assigned to Zebco Corporation, Tulsa, Okla., which is also incorporated herein for all purposes.

Since optical signals are essentially unidirectional, the optical signal may be blocked by some obstacle, e.g. obstacle 31, such as a passenger standing in a direct line between transmitters 18 and 20 and receiver 22, one or more optical reflectors 30 may be attached to portion 32 of boat 12 to help reflect a stronger optical signal to receiver 22. Optical reflectors 30 may be removably attached, for example, on both sides of boat 12 as shown in FIG. 2. Optical reflectors 30 may be mirrored surfaces or a plurality of mirrored surfaces to reflect the optical signal from various points on boat 12 to receiver 22. Reflectors 30 may be permanently attached or mounted in a temporary fashion such as by brackets. Although reflectors are described as one way of reflecting the optical signal from the transmitter, it is contemplated as part of this invention that any shiny surface carried by the boat capable of reflecting the optical signal to receiver 22 will work equally well.

FIG. 2 shows an example of an optical signal 34 being transmitted by hand-held transmitter 18 reflecting off a side optical reflector 30, being received by optical receiver 22, and avoiding obstacle 31.

The control system of the present invention may also be adapted in one embodiment to control main propulsion motor 14. A steering motor 36 may be attached to main propulsion motor 14 to turn motor 14 with respect to boat 12 and thereby steer boat 12 in a desired direction. A throttle may also be provided for controlling the speed of motor 14. An optical receiver 38 may be coupled to steering motor 36 to provide an appropriate signal to turn motor 14 as desired in response to an optical signal representing the desired direction and coupled to the throttle for controlling the speed of motor 14 in response to the optical signal. To address the potential of having the optical signal blocked enroute to receiver 38, one or more optical reflectors 40 may be attached to an inner portion 32 of boat 12 intermediate of the anticipated position of operator 10 and motor 14, e.g., position 42. Reflectors 40 may be of the same type design as reflectors 30. Hand-held transmitter 18 or foot-operated transmitter 20 may be used for generating optical signals indicative of the desired direction and speed of motor 14.

Figure 3:
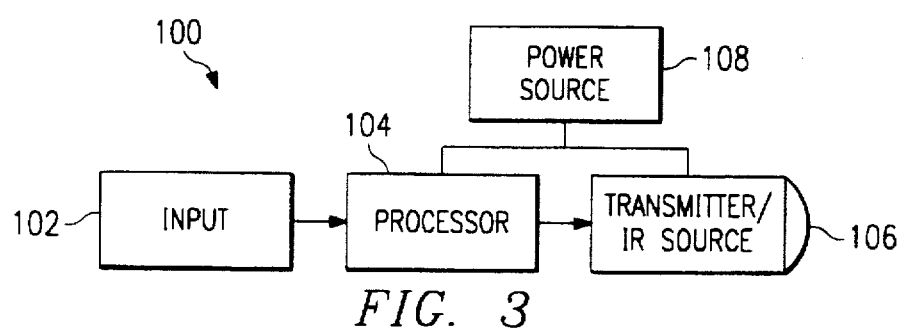
FIG. 3 is an electrical schematic diagram of one embodiment of the transmitter circuit located in a transmitter unit.

FIG. 3 shows a block diagram for optical transmitter circuit 100 that may be located within optical transmitters 18 and 20. Optical transmitter circuit 100 includes input 102 coupled to processor 104. Input 102 receives human entered commands from, for example, the buttons on a remote control to control trolling motor 16. Examples of the commands include left turn, right turn, more speed, less speed, or other appropriate inputs for controlling the functions of trolling motor 16. These commands from input 102 are provided to processor 104. Processor 104 receives these commands and generates the appropriate output commands for controlling trolling motor 16. The commands generated by processor 106 are provided to transmitter/IR source 106. Coupled to processor 104 and transmitter/IR source 106 is power source 108. In one embodiment of transmitter circuit 100, power source 108 would be a battery suitable for placement in hand-held transmitter 18 or foot-operated transmitter 20. Using the power from power source 108, transmitter/IR source 106 transmits the commands from processor 104 as optical signals. Processor 104 and transmitter/IR source 106 may be embodied in commercially available optical circuit part number PIC16C54/P/XT available from Microchip Technology Inc., of Chandler, Ariz.

Figure 4:
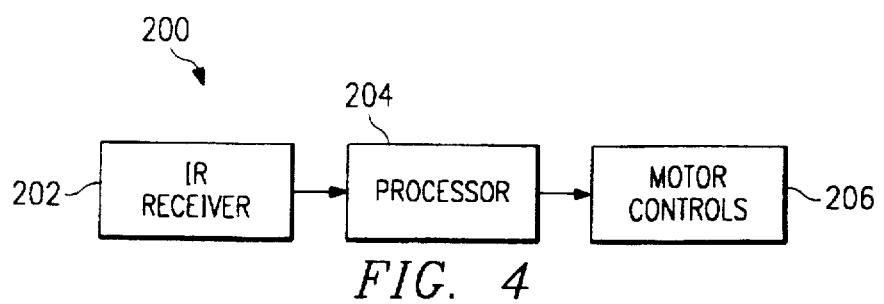
FIG. 4 is an electrical schematic diagram of one embodiment of a receiver.

FIG. 4 is a block diagram of one embodiment of optical receiver circuit 200 for use as receiver 22 or receiver 38. Receiver circuit 200 includes optical receiver 202 for receiving the optical signals transmitted by transmitter/IR source 106 of transmitter circuit 100. Optical receiver 202 provides the commands it receives to processor 204. Processor 204, in turn, generates control signals that are provided to motor controls 206 which include steering motor 24 and throttle 26. Motor controls 206 then control trolling motor 16 (or outboard motor 14) as previously described. Optical receiver 202 and processor 204 may be embodied in commercially available optical circuit part number PIC16C54/P/XT from Microchip Technology Inc., of Chandler, Ariz. It is noted that while examples of optical circuits 100 and 200 have been provided, that the present invention is not intended to be limited by any particular circuit or combination of circuit elements.

According to an embodiment, infrared (IR) transmitter 18, 22, 100 and receiver 38, 200 may be used, and an EPROM-based 8-bit CMOS microcontroller may be utilized. General reference is made to U.S. Pat. No. 5,473,758, assigned to Microchip Technology, Inc., which is incorporated for all purposes.

With respect to the programming that may be utilized with such a system, the following description provides one approach. With respect to the transmitter 18, 22, 100, it may have a port B and a port A. Port B, bits 0–7, could be devoted to input, and port A, bits 1–3, may set to input. Port A, bit 0 may be set for output. A watchdog timer may be turned off initially. The microcontroller may be maintained in a sleep mode. A data string indicting power on may then be sent to the receiver 38, 200. A wake signal may then be generated on a MCLR line when a switch is pressed. The signal may be an active logic low for about 10 micro-seconds. When a wake up signal is generated on the MCLR line, ports B, bits 0–7, and port A, bit 3, may be read to determine which inputs are low indicating a switch closure. Port A, bit 0, may then generate a 40 kilohertz carrier which will activate the IR output device. Port A, bit 0, may then send a data string modulating the 40 kilohertz carrier. A data format that may be used is as follows.

(1) One start bit active high 10 milliseconds long.

(2) One data bit active low. This bit may be variable in width depending on which switch input is active. For example, port A, bit 2 may equal 100 milliseconds wide; Port A, bit 3, may equal 90 milliseconds wide; Port B, bit 7, may be 80 milliseconds wide; Port B, bit 6, may be 70 milliseconds wide; Port B, bit 5, may be 60 milliseconds wide; Port B, bit 4, may be 50 milliseconds wide; Port B, bit 3, may be 40 milliseconds; Port B, bit 2, may be 30 milliseconds wide; Port B, bit 1, may be 20 milliseconds wide; and Port B, bit 0, may be 10 milliseconds wide.

(3) One stop bit at 20 milliseconds wide active high.

When a switch closure is detected, the carrier and data string may be generated on port A, bit 0. Thereafter, port A, bit 2 may be checked for a low battery condition. If port A, bit 2 is low, the data string for a low battery may be sent also. After a switch closure is detected and transmitted, port B may be monitored to detect the switch opening. The data string may be repeatedly transmitted until the switch is opened and the port returns at logic high.

With respect to IR receiver 38, 200, the following power up conditions may be arranged: Port A, bits 1–3 may be set to input; port A, bit 3 may be set to output; port B, bit 0–7 may be set to a logic one outputs; and watchdog timer may be off. The microcontroller may continuously monitor port A, bit 0 for a data string to be sent. After the start bit is detected, it may wait for the end of the start bit indicated by a logic low. The next bit may indicate switch bit data. After timing the data bit, it may be stored until a stop bit is detected. The output will then be a logic low sent to the corresponding output port bit. This logic state may remain as long as the transmitter is sending the switch closure. When the transmitter stops sending the switch closure, port B may change to a logic one.

With respect to signals from the foot pedal 20, when a data string is received indicating the foot pedal 20 is on, a logic low may be output on the corresponding output port bit. This may remain low until the switch is pressed again. Pressing the switch again may cause a logic high to be output. Thus, it has a toggle function.

When a low battery data string is received, the foot pedal "on" signal may be toggled on and off every 500 milliseconds. The receiver 38, 200 may continue to toggle the "on" signal until the next transmission from the IR transmitter 18, 22, 100. It is to be understood that this is but one of many possible approaches to programming related to aspects of the invention.

Although the present invention and its advantages have been described in detail, it should be understood that various changes, substitutions and all alterations can be made therein without departing from the spirit and scope of the invention as defined by the appended claims.

What is claimed is:

1. A system for controlling the direction and speed of a trolling motor mounted on a boat from a remote position, the system comprising:
    a steering motor coupled to the trolling motor for turning the trolling motor relative to the boat for directional control thereof;
    a throttle coupled to the trolling motor for controlling the speed of the trolling motor;
    an optical transmitter for developing an optical signal representing the desired direction and speed for the trolling motor;
    an optical receiver coupled to the steering motor and to the throttle on the trolling motor, the optical receiver for receiving the optical signal and activating the steering motor in response to the desired direction represented by the optical signal and for activating the throttle on the trolling motor in response to the desired speed represented by the optical signal; and
    a reflecting surface on a portion of the boat capable of reflecting the optical signal to the optical receiver.

2. The system of claim 1, wherein the optical transmitter is an infrared (IR) transmitter.

3. The system of claim 1 wherein the reflecting surface comprises a mirrored surface.

4. The system of claim 1 wherein the reflecting surface comprises a plurality of mirrored surfaces.

5. The system of claim 1 wherein the reflecting surface is removably mounted to a boat.

6. The system of claim 1 wherein the optical transmitter comprises a hand-held optical transmitter.

7. The system of claim 1 wherein the optical transmitter comprises a foot-operated transmitter.

8. A system for controlling the direction and speed of a trolling motor mounted on a boat from a remote position, the system comprising:
    a steering motor coupled to the trolling motor for turning the trolling motor relative to the boat for directional control thereof;
    a throttle coupled to the trolling motor for controlling the speed of the trolling motor;
    an optical transmitter for developing an optical signal representing the desired direction and speed for the trolling motor;
    an optical receiver coupled to the steering motor and to the throttle on the trolling motor, the optical receiver for receiving the optical signal and activating the steering motor in response to the desired direction represented by the optical signal and for activating the throttle on the trolling motor in response to the desired speed represented by the optical signal; and
    a reflecting surface on a portion of the boat capable of reflecting the optical signal to the optical receiver, wherein the reflecting surface comprises a first mirrored surface mounted on a first side wall of the boat and a second mirrored surface mounted on a second side wall of the boat.

9. A method for controlling the direction and speed of a fishing boat from a remote position, the method comprising the steps of:
    entering the desired speed and direction on a remote transmitter;
    generating optical signals from the remote transmitter representing the desired speed and direction entered on the remote transmitter;
    reflecting the optical signals off an optical reflector on a portion of the fishing boat;
    receiving the optical signals with a receiver;
    generating control signals from the optical signal received by the receiver;
    delivering the control signals to a steering motor, which is coupled to a trolling motor, and to a throttle, which is coupled to the trolling motor, to move the fishing boat at the desired speed and in the desired direction.

10. The method of claim 9, wherein the step of generating optical signals from the remote transmitter comprises the step of generating infrared (IR) signals from the remote transmitter representing the desired speed and direction entered on the remote transmitter.

11. The method of claim 9 wherein the step of reflecting the optical signals off an optical reflector comprises the step of reflecting the optical signal off a reflector removably attached to a boat.

12. The method of claim 9 wherein the step of reflecting the optical signal off a reflector comprises reflecting the optical signal off a mirrored surface mounted on a side of the boat.

* * * * *